US009616628B2

(12) United States Patent
Mancini et al.

(10) Patent No.: US 9,616,628 B2
(45) Date of Patent: Apr. 11, 2017

(54) APPARATUS AND PROCESS FOR MANUFACTURING TYRES FOR VEHICLE WHEELS

(75) Inventors: Gianni Mancini, Milan (IT); Maurizio Marchini, Milan (IT); Gaetano Lo Presti, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 0 days.

(21) Appl. No.: 13/055,114

(22) PCT Filed: Jul. 23, 2008

(86) PCT No.: PCT/IB2008/001933
§ 371 (c)(1),
(2), (4) Date: Apr. 13, 2011

(87) PCT Pub. No.: WO2010/064066
PCT Pub. Date: Jun. 10, 2010

(65) Prior Publication Data
US 2011/0186207 A1    Aug. 4, 2011

(51) Int. Cl.
*B29D 30/32*    (2006.01)
*B29D 30/24*    (2006.01)

(52) U.S. Cl.
CPC .......... *B29D 30/32* (2013.01); *B29D 30/244* (2013.01); *B29D 2030/3207* (2013.01); *B29D 2030/3264* (2013.01); *B29D 2030/3278* (2013.01)

(58) Field of Classification Search
CPC ...... B29D 30/18; B29D 30/32; B29D 30/244; B29D 30/248
(Continued)

(56) References Cited

U.S. PATENT DOCUMENTS 2,664,937 A * 1/1954 Hirsch et al. ................. 156/403
3,016,321 A * 1/1962 Beckadolph et al. ........ 156/402
(Continued)

FOREIGN PATENT DOCUMENTS

AT    317 014    8/1974
CN    1564739 A    1/2005
(Continued)

OTHER PUBLICATIONS

English language Abstract of JP 58-108125 (original document dated Jun. 1983).*
(Continued)

*Primary Examiner* — Martin Rogers
(74) *Attorney, Agent, or Firm* — Finnegan, Henderson, Farabow, Garrett & Dunner, L.L.P.

(57) ABSTRACT

An apparatus for manufacturing tires for vehicle wheels wherein each tire includes a carcass structure formed starting from at least one carcass ply laid on a forming support extended along a longitudinal axis. The apparatus includes at least one device for positioning at least one annular anchoring structure on at least one end edge of the carcass ply, the positioning device being circumferentially extended around the longitudinal axis of the forming support and axially movable with respect to the forming support between an operating position distal from the forming support and at least one operating position close to the forming support. The apparatus further includes a device for turning up the end edge of the carcass ply around the annular anchoring structure, the turning up device being circumferentially extended about the longitudinal axis of the forming support and axially movable for approaching/moving away to/from the forming support. The positioning device and the turning up device are radially expandable/contractible in a synchronous manner with respect to the longitudinal axis of the
(Continued)

forming support and are settable in a plurality of different operating radial positions, each operating radial position being selected based on a respective radial dimension of the tire to be manufactured.

12 Claims, 6 Drawing Sheets

(58) Field of Classification Search
USPC ....... 156/131, 132, 135, 398, 400, 401, 402, 156/421.4
See application file for complete search history.

(56) References Cited

U.S. PATENT DOCUMENTS

| | | | | |
|---|---|---|---|---|
| 3,032,093 | A | * | 5/1962 | Nebout ........................ 156/402 |
| 3,078,204 | A | * | 2/1963 | Appleby ....................... 156/132 |
| 3,765,986 | A | * | 10/1973 | Brey ............................ 156/400 |
| 3,776,793 | A | | 12/1973 | Frazier |
| 3,948,591 | A | * | 4/1976 | Kratochvil et al. ............. 425/32 |
| 4,324,604 | A | * | 4/1982 | Alexander et al. ........... 156/131 |
| 4,353,771 | A | * | 10/1982 | Yuhas .......................... 156/403 |
| 4,498,948 | A | | 2/1985 | Brown et al. |
| 4,508,586 | A | | 4/1985 | Brown et al. |
| 4,584,038 | A | | 4/1986 | Enders |
| 4,923,553 | A | * | 5/1990 | Nishide et al. ............... 156/401 |
| 5,087,316 | A | * | 2/1992 | Sumiuchi et al. ............ 156/396 |
| 5,858,165 | A | | 1/1999 | Takasuga |
| 7,361,243 | B2 | * | 4/2008 | Ogawa ......................... 156/117 |
| 2003/0168144 | A1 | * | 9/2003 | Weaver et al. ............... 152/415 |
| 2005/0150587 | A1 | | 7/2005 | Wiens |
| 2005/0211366 | A1 | | 9/2005 | Ogawa |
| 2006/0102272 | A1 | | 5/2006 | Iyanagi et al. |

FOREIGN PATENT DOCUMENTS

| | | | | |
|---|---|---|---|---|
| DE | 853 346 | C | | 10/1952 |
| DE | 17 29 571 | A1 | | 6/1971 |
| DE | 21 18 467 | A1 | | 10/1972 |
| DE | 2118467 | | | 10/1972 |
| DE | 24 11 013 | A1 | | 9/1975 |
| EP | 0 150 925 | A1 | | 8/1985 |
| EP | 1 537 986 | A1 | | 6/2005 |
| FR | 2006441 | | * 12/1969 | ............ B29H 17/00 |
| GB | 878837 | | 10/1961 | |
| GB | 947182 | | * 1/1964 | ............ B29D 30/32 |
| GB | 1153944 | | 6/1969 | |
| GB | 1390399 | | * 4/1975 | ............ B29D 30/32 |
| JP | 49-103967 | | * 10/1974 | ............ B29C 67/00 |
| JP | 58-108125 | | * 6/1983 | ............ B29H 17/22 |
| JP | 59-230736 | | * 12/1984 | ............ B29H 17/22 |
| JP | 60-92837 | | 5/1985 | |
| JP | 02-153728 | | * 6/1990 | ............ B29D 30/32 |
| JP | 2622987 | | * 4/1997 | ............ B29D 30/32 |
| JP | 11-268150 | | * 10/1999 | ............ B29D 30/32 |
| SU | 295691 | | 2/1971 | |
| SU | 1270020 | | 11/1986 | |
| SU | 750902 | | 1/1991 | |
| SU | 1195567 | | 12/1991 | |
| WO | WO 2008/001154 | | 1/2008 | |
| WO | WO-2008/001154 | A1 | 1/2008 | |
| WO | WO-2009/054185 | A1 | 4/2009 | |
| WO | WO-2009/063264 | A1 | 5/2009 | |
| WO | WO-2010/018420 | A1 | 2/2010 | |

OTHER PUBLICATIONS

Machine-generated English language Abstract of JP 11-2681 50 (original document dated Oct. 1999).*
Machine-generated English language translation of FR 2006441 (original document dated Dec. 1969).*
English lanuagage translation of JP S49-103967 (original document dated Oct. 1974).*
English language translation of JP 58-108125 (original document dated Jun. 1983).*
English language Abstrac for JP 59-230736 (original document dated Dec. 1984).*
Machine generated English language translation of JP 2622987 (original document dated Apr. 1997).*
English language translation of JP 02-513728 (original document published Jun. 1990).*
International Search Report from the European Patent Office for International Application No. PCT/IB2008/001912 (WO-2010/018410 A1) (Mailed date Apr. 20, 2009).
Decision on Grant Patent for Invention issued Apr. 26, 2012 by Russian Patent Office in corresponding Russian Patent Application No. 2011106774/05(009623) (11 pages).
English-language translation of Decision on Grant Patent for Invention issued Apr. 26, 2012 by Russian Patent Office in corresponding Russian Patent Application No. 2011106774/05(009623) (7 pages).
International Search Report from the European Patent Office for International Application No. PCT/IB2008/001933 (Mail date Apr. 14, 2009).
Notification of the First Office Action issued by State Intellectual Property Office of the People's Republic of China in corresponding Application No. 200880131138.8 on Feb. 17, 2013 (6 pages).

\* cited by examiner

Fig.7

APPARATUS AND PROCESS FOR MANUFACTURING TYRES FOR VEHICLE WHEELS

CROSS REFERENCE TO RELATED APPLICATION

This application is a national phase application based on PCT/IB2008/001933, filed Jul. 23, 2008, the content of which is incorporated herein by reference.

BACKGROUND OF THE INVENTION

Field of the Invention

The present invention relates to an apparatus for manufacturing tyres for vehicle wheels.

The invention also relates to a process for manufacturing a lot of tyres for vehicle wheels comprising at least two tyres of different radial dimensions.

Description of the Related Art

A tyre for vehicle wheel generally comprises a carcass structure comprising at least one carcass ply formed by reinforcing cords embedded in an elastomeric matrix. The carcass ply has end edges respectively engaged with annular anchoring structures. The latter are arranged in the tyre zones usually identified with the name of "beads" and normally consist each of an annular substantially circumferential insert on which at least one filling insert is applied, in a radially outer position thereof. Such annular anchoring structures are commonly identified as "bead cores" and have the task of keeping the tyre well fixed to the anchoring seat specifically provided in the wheel rim, thus preventing, in operation, the radially inner edge (also referred to as an "end edge" herein) of the tyre coming out from such seat.

At the beads specific reinforcing structures may be provided having the function of improving the torque transmission to the tyre.

In a radially outer position with respect to the carcass ply, a belt structure comprising one or more belt layers is associated, said belt layers being arranged radially one of top of the other and having textile or metal reinforcing cords with crossed orientation and/or substantially parallel to the direction of circumferential extension of the tyre.

Between the carcass structure and the belt structure a layer of elastomeric material, known as "under-belt", can be provided, said layer having the function of making the radially outer surface of the carcass structure as uniform as possible for the subsequent application of the belt structure.

In a radially outer position with respect to the belt structure a tread band is applied, made from elastomeric material as well.

Between the tread band and the belt structure a so-called "under-layer" of elastomeric material can be arranged, said layer having properties suitable to ensure a steady union of the tread band itself.

On the side surfaces of the carcass structure respective sidewalls of elastomeric material are also applied, each one extending from one of the side edges of the tread band up to the respective annular anchoring structure to the beads. An apparatus for manufacturing the aforementioned carcass structure typically comprises a forming support extending along a longitudinal axis, wherein the above carcass ply is laid on a device for positioning the bead core on the end edge of the carcass ply and a device for turning up the end edge of the carcass ply about the bead core.

The device for positioning the bead core essentially comprises a ring structure axially movable towards the forming support for positioning the bead core on the end edge of the carcass ply and away from the forming support for allowing the execution of the subsequent steps of the tyre bead forming process.

WO 2008/001154 to the same Applicant shows an apparatus wherein the device for turning up the end edge of the carcass ply about the bead core essentially comprises an annularly continuous pressure element axially movable toward/away to/from the forming support. Such pressure element comprises a plurality of arms, each one carrying a respective turning up roller at a free end thereof. The turning up rollers are arranged one next to the other in a circumferential direction and coaxially with respect to the longitudinal axis of the forming support. The rollers are radially movable in a synchronous manner, thus obtaining the radial expansion/contraction of the above pressure element between a contracted position and an expanded position. The combination of the radial movement of the turning up rollers and of the movement of such rollers toward/away to/from the forming support, allows turning up the end edge of the carcass ply around the bead core for making the tyre bead. The turning up device is further provided with means for adjusting the contracted position of the pressure element based on the radial dimension of the tyre to be made.

SUMMARY OF THE INVENTION

The Applicant has noted that a turning up device of the type schematically described above may be used for carrying out the step of turning up the end edge of the carcass ply in the manufacturing of tyres having different radial dimensions.

However, the Applicant has noted that with a device of the type described above it is possible to carry out the aforementioned turning up step for tyres having at most two or three different and adjacent fittings; in other words, the device described above allows carrying out the turning up step for a number of tyres having radial dimensions that differ by two or three inches only.

The Applicant has further noted that even using an apparatus of the type described in WO 2008/001154, the manufacturing of tyres of different radial dimensions would nevertheless continue to require the use of a bead core positioning device specifically designed based on the specific radial dimension of the tyre to be manufactured.

The Applicant has further found that, if a step of pulling down the end edge of the carcass ply prior to the positioning of the bead core is provided and/or if a step of pulling down the filling insert of the bead core prior to the turning up of the end edge of the carcass ply about the bead core is provided, the manufacturing of tyres of different radial dimensions would require the use of respective devices specifically designed based on the specific radial dimension of the tyre to be manufactured.

The Applicant has now found that it is possible to manufacture tyres of different radial dimensions using always the same apparatus, making all the devices that are involved in the execution of the various manufacturing steps of the carcass structure, and thus at least the device for positioning the bead cores and the device for turning up the end edge of the carcass ply, radially expandable/contractible with respect to the longitudinal axis of the forming support of the apparatus.

The Applicant has further found that, if a step of pulling down the end edge of the carcass ply prior to the positioning of the bead core is provided and/or if a step of pulling down the filling insert of the bead core prior to the turning up of the end edge of the carcass ply about the bead core is provided, it is possible to make radially expandable/contractible with respect to the longitudinal axis of the forming support of the apparatus also the devices intended to carry out the above steps, thus also in these cases being able to manufacturing tyres of different radial dimensions with a same apparatus.

The Applicant has thus found that providing an apparatus for manufacturing tyres wherein the bead core positioning device and the device for turning up the end edge of the carcass ply and, if provided, also the device for pulling down the end edge of the carcass ply and the device for pulling down the filling insert of the bead core, are expandable/contractible in radial direction it is possible to set such devices, and thus the apparatus composed thereby, in a plurality of different operating radial positions, each operating radial position being selected based on the radial dimension of the tyre to be manufactured.

Throughout the present description and following claims, the terms "radial" and "axial" and the expressions "radially inner/outer" and "axially inner/outer" are used with reference to the radial direction and to the axial direction of the forming support. The terms "circumferential" and "circumferentially" instead, are used referring to the annular extension of the forming support.

In a first aspect thereof, the present invention therefore relates to an apparatus for manufacturing tyres for vehicle wheels, the tyres comprising a carcass structure formed starting from at least one carcass ply laid on a forming support extended along a longitudinal axis, the apparatus comprising:

- at least one device for positioning at least one annular anchoring structure on at least one end edge of said at least one carcass ply, the positioning device being circumferentially extended around the longitudinal axis of the forming support and axially movable with respect to the forming support between an operating position distal from the forming support and at least one operating position close to the forming support;
- at least one device for turning up the end edge of the carcass ply around the annular anchoring structure, the turning up device being circumferentially extended about the longitudinal axis of the forming support and axially movable for approaching/moving away to/from the forming support;

wherein the positioning device and the turning up device are radially expandable/contractible in a synchronous manner with respect to the longitudinal axis of the forming support and are settable in a plurality of different operating radial positions, each operating radial position being selected based on a respective radial dimension of the tyre to be manufactured.

Throughout the present description and in the following claims, the expression: radial dimension of the tyre, indicates the nominal fitting diameter of the rim whereon the tyre is intended to be fitted, such diameter generally being indicated in inches.

In the present description and following claims, the expression "annular anchoring structure" and the term "bead core" shall often be used without distinction to indicate the same component of the tyre.

Advantageously, an apparatus of the type described above may be used for manufacturing tyres having different radial dimensions; in fact, such apparatus is settable in a plurality of different operating configurations, each operating configuration being defined by a respective radial position of the devices for positioning the bead core and for turning up the end edge of the carcass ply, such radial position being properly selected based on the specific radial dimension of the tyre to be manufactured.

Advantageously, the apparatus setup time and costs are thus drastically reduced when passing from the manufacturing of a tyre having a certain radial dimension to the manufacturing of a tyre having a different radial dimension.

Moreover, advantageously, the apparatus of the present invention allows manufacturing tyres with at least four different and adjacent fittings.

The apparatus of the present invention can comprise, individually or in a combination, at least one of the following preferred features.

Preferably, the device for positioning the annular anchoring structure comprises a plurality of positioning members arranged adjacent to one another along a circumferential direction and coaxially to the longitudinal axis of the forming support, said positioning members being radially movable in a synchronous manner with respect to the longitudinal axis of the forming support between a maximum contraction position and a maximum expansion position.

Advantageously, the synchronous movement in the radial direction of the aforementioned positioning members causes the radial expansion/contraction of the positioning device of the annular anchoring structure and allows setting up the aforementioned device to the radial position defined in the design stage based on the radial dimension of the tyre to be manufactured.

Preferably, the apparatus of the present invention comprises a device for controlling the radial movement of said positioning members, such control device comprising a sliding guide with a spiral whose rotation around the longitudinal axis of the forming support can be controlled and a plurality of sliding runners extending radially with respect to said longitudinal axis, each of said positioning members being slidingly coupled to a respective sliding runner and to said sliding guide with a spiral shape so that a predetermined angular movement of the guide with a spiral shape causes a predetermined radial movement of each positioning member.

Advantageously, the setup of the device for positioning the annular anchoring structure to the desired radial position is achieved by simply rotating the aforementioned sliding guide with a spiral shape by a predetermined angle. Such rotation in fact causes a predetermined radial movement of the positioning members.

Preferably, the device for turning up the end edge of the carcass ply comprises a plurality of turning up members arranged adjacent to one another along a circumferential direction and coaxially to the longitudinal axis of the forming support, said turning up members being radially movable in a synchronous manner with respect to the longitudinal axis of the forming support between a maximum contraction position and a maximum expansion position.

Advantageously, the synchronous movement in the radial direction of the above positioning members carries out the radial expansion/contraction of the device for turning up the end edge of the carcass ply and allows setting up the above device to the radial position defined in the design stage based on the radial dimension of the tyre to be manufactured.

Preferably, the apparatus of the present invention comprises a device for controlling the radial movement of said turning up members, such control device comprising a sliding guide with a spiral shape whose rotation around the longitudinal axis of the forming support can be controlled and a plurality of sliding runners extending radially with respect to said longitudinal axis, each of said turning up members being slidingly coupled to a respective sliding runner and to said sliding guide with a spiral shape so that a predetermined angular movement of the guide with spiral movement causes a predetermined radial movement of each turning up member.

Advantageously, the setup of the device for turning up the end edge of the carcass ply to the desired radial position is achieved by simply rotating the above sliding guide with a spiral shape by a predetermined angle. Such rotation in fact causes a predetermined radial movement of the turning up members.

Preferably, each turning up member comprises a roller associated to a free end of a respective arm, each roller being coupled to the circumferentially consecutive roller by a compression spring.

Advantageously, the above springs ensure the structural continuity in the circumferential direction of the device for turning up the end edge of the carcass ply. Such springs further ensure the desired concentricity of the assembly consisting of the above turning up members with respect to axis X-X of the forming support upon the variation of the radial position of the rollers during the turning up of the end edge of the carcass ply and the setup of the device for manufacturing tyres having different radial dimensions.

Preferably, the device for positioning the annular anchoring structure and the device for turning up the end edge of the carcass ply are slidingly mounted on at least one sliding track extended along a direction parallel to the longitudinal axis of the forming support, the turning up device being associated to said at least one sliding track in an axially outer position to the positioning device with respect to the forming support and wherein the arms of the turning up members are axially sliding in radially inner position with respect to the positioning members.

Advantageously, a configuration of the type described above allows containing the radial and axial dimension of the apparatus, with evident advantages in terms of space economy.

In a preferred embodiment thereof, the apparatus of the present invention further comprises at least one device for pulling down the end edge of the carcass ply towards the longitudinal axis of the forming support, such pulling down device being circumferentially extended around the longitudinal axis of the forming support and axially movable between an operating position distal from the forming support and an operating position proximal to the forming support, the aforementioned pulling down device being radially expandable/contractible with respect to the longitudinal axis of the forming support synchronously to the positioning device and to the turning up device, the aforementioned pulling down device being further settable in a plurality of different operating radial positions, each operating radial position being selected based on a respective radial dimension of the tyre to be manufactured.

Advantageously, such device can be used for manufacturing tyres of different radial dimensions.

Preferably, the radial expansion/contraction of the device for pulling down the end edge of the carcass ply is actuated by the radial expansion/contraction of the positioning device.

In a preferred embodiment thereof, the above pulling down device comprises a plurality of ply pulling down members arranged adjacent to one another along a circumferential direction and coaxially to the longitudinal axis of the forming support, said ply pulling down members comprising respective arms radially movable with respect to the longitudinal axis of the forming support between a maximum contraction position and a maximum expansion position.

Advantageously, the synchronous movement in the radial direction of the arms of the aforementioned ply pulling down members causes the radial expansion/contraction of the device for turning up the end edge of the carcass ply and allows setting up the above device to the radial position defined in the design stage based on the radial dimension of the tyre to be manufactured.

Preferably, each of the aforementioned ply pulling down members comprises at least two longitudinal finger plates arranged side by side and partially overlapped in a circumferential direction. More preferably, also the circumferentially adjacent finger plates of two circumferentially consecutive ply pulling down members are partially overlapped in the circumferential direction. Advantageously, the partial overlapping of the finger plates allows an even and effective turning up of the end edge of the carcass ply irrespective of the radial position of the pulling down members, and thus irrespective of the radial dimension of the tyre to be manufactured.

Preferably, the device for positioning the annular anchoring structure is axially slidable in a radially outer position with respect to said finger plate and, for a predetermined radial position of the device for positioning the annular anchoring structure and the device for pulling down the end edge of the carcass ply, the finger plates are retained by the above positioning device in a radially contracted configuration when such positioning device is radially overlapped to the finger plates, the finger plates taking up a radially expanded configuration when such positioning device is axially moved with respect to the device for pulling down the end edge of the carcass ply so as not to be radially overlapped to the finger plates.

Advantageously, in the passage from the radially expanded configuration to the radially contracted configuration, the finger plates causes the pulling down of the end edge of the carcass ply. More advantageously, for a predetermined radial position of the device for positioning the annular anchoring structure and the device for pulling down the end edge of the carcass ply, the radial expansion of the finger plates is actuated by the axial movement of the above pulling down device with respect to the device for positioning the annular anchoring structure, while the radial contraction of the finger plates is actuated by the axial movement of the device for positioning the annular anchoring structure with respect to the device for pulling down the end edge of the carcass ply. An advantageous process economy is thus obtained.

The annular anchoring structure preferably comprises at least one substantially circumferential annular insert and at least one filling insert associated in a radially outer position with respect to the substantially circumferential annular insert, and in a preferred embodiment thereof, the apparatus of the present invention comprises at least one device for pulling down the filling insert end edge of the carcass ply.

Preferably, the device for pulling down the filling insert comprises a plurality of filling insert pulling down members, each of such members being supported by a respective positioning member and being axially slidable with respect to said positioning member.

BRIEF DESCRIPTION OF THE DRAWINGS

Further features and advantages of the present invention will appear more clearly from the following detailed description of some preferred embodiments of an apparatus and process according to the present invention, made with reference to the annexed drawings. In such drawings.

DETAILED DESCRIPTION OF THE INVENTION

Figure 1:
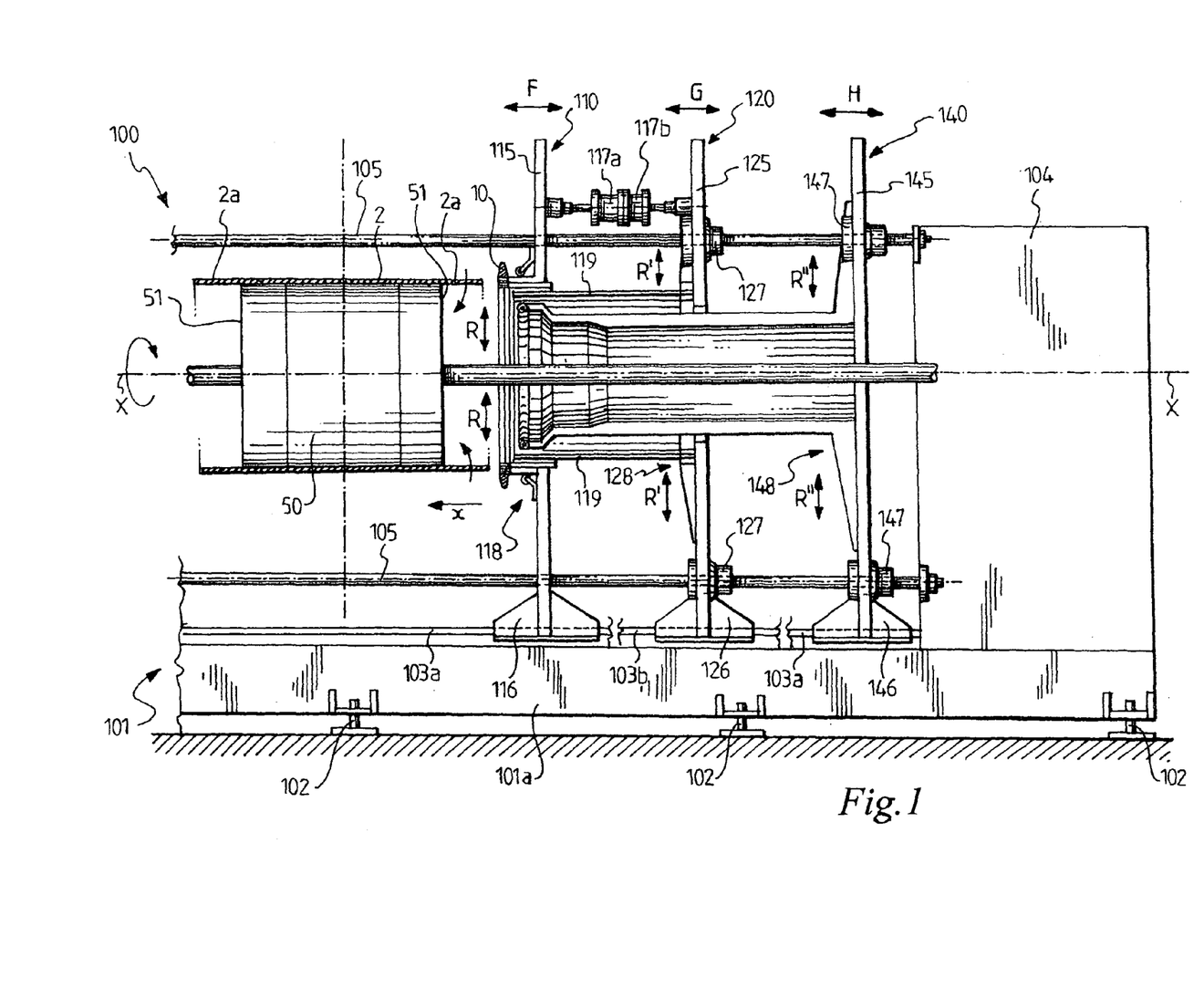
FIG. 1 is a schematic side view of a portion of an apparatus for manufacturing tyres for vehicle wheels according to the present invention.

In FIG. 1, reference numeral 100 globally indicates a portion of an exemplifying embodiment of an apparatus usable in a process for manufacturing a tyre for vehicle wheels, according to a preferred embodiment of the present invention.

In particular, apparatus 100 is used in a step of building a carcass structure of the tyre for providing one or more annular anchoring structures 10 (hereinafter also called bead cores and better shown in FIG. 2) at that region of the carcass structure that will make the tyre bead. Such annular anchoring structures 10 are intended for keeping the tyre well fixed to the anchoring seat specifically provided in the vehicle tyre rim.

The building of the carcass structure of the tyre comprises the initial step of arranging a carcass ply 2 on a substantially cylindrical forming support 50 so that the opposite end edges 2a of the carcass ply project cantilevered from the forming support 50. Subsequently, each annular anchoring structure 10 is associated to each of the opposite end edges 2a of the carcass ply 2.

In the embodiment illustrated in the annexed figures, each annular anchoring structure 10 is associated to each end edge 2a of the carcass ply 2 at a respective side shoulder 51 of the forming support 50.

For simplicity of description, the description of apparatus 100 and of the process carried out thereby shall be made hereinafter with reference to only one of the opposite end edges 2a of the carcass ply 2 and to a side shoulder 51 of the forming support 50 (thus, with reference to only one of the opposite tyre beads). In fact, apparatus 100 is symmetrical in axial direction and the description made with reference to one end edge 2a and to one side 51 of the forming support 50 also applies with reference to the axially opposite end edge and side of the forming support 50.

The forming support 50 is rotatably mounted about an axis of rotation X-X in a totally conventional manner. The structure of the forming support 50 is not described in detail herein since it can be made in any convenient manner by a man skilled in the art. Likewise, the members for supporting and moving the forming support 50 shall not be described as they are totally conventional.

Figure 2:
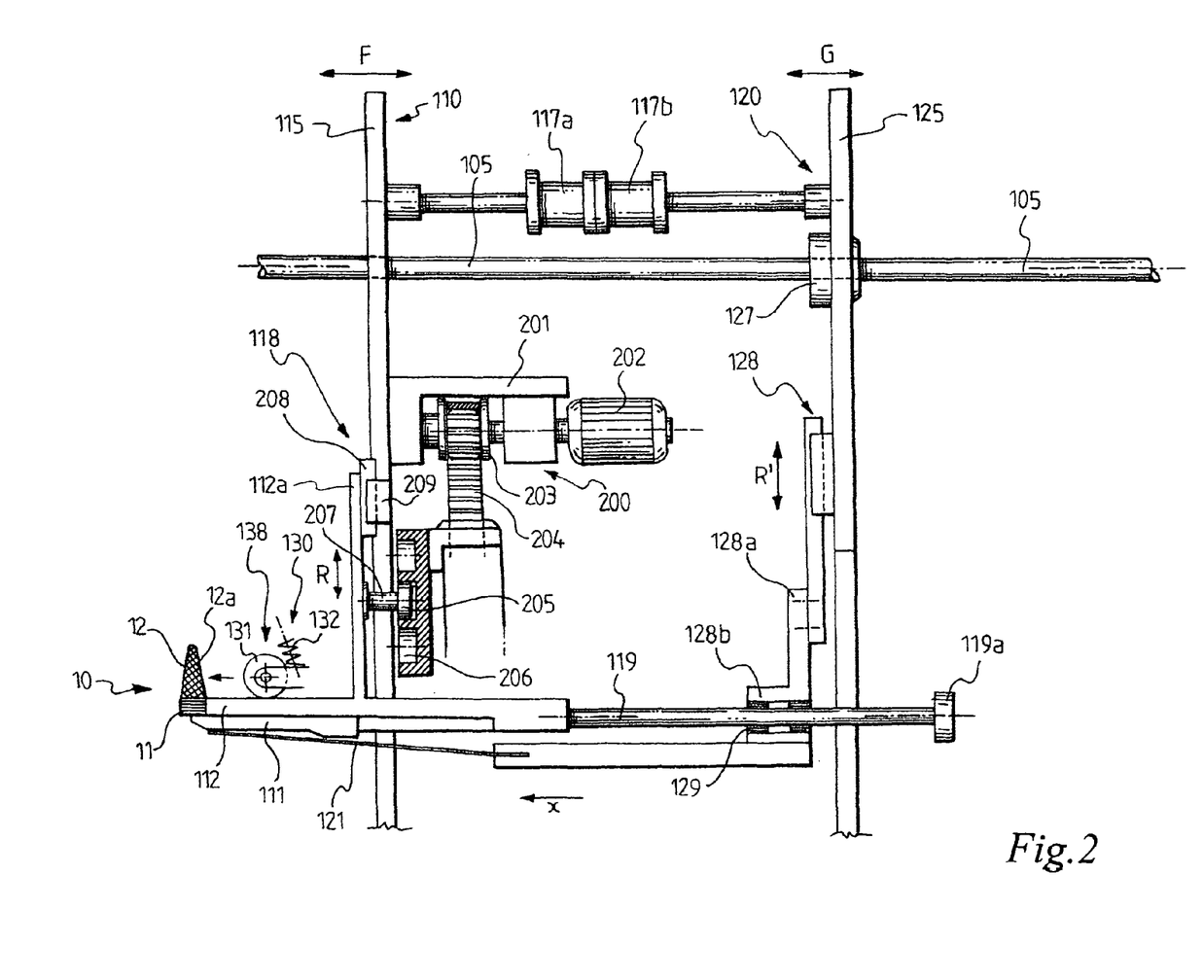
FIG. 2 is an enlarged schematic side view of a portion of a bead core positioning device and of a ply pulling down device of the apparatus of FIG. 1.

As illustrated in FIG. 2, the annular reinforcing structure 10 comprises at least one substantially circumferential annular insert 11 and at least one filling insert 12 applied in radially outer position thereof.

Apparatus 100 comprises a support frame 101 provided with support feet 102. Opposite first pairs of axial sliding tracks 103a (only one track 103a being visible in FIG. 1) and opposite second pairs of tracks 103b (only one track 103b being visible in FIG. 1) parallel to tracks 103a are mounted on a base 101a of the support frame 101.

Apparatus 100 further comprises, at each of the axial ends thereof, a side upright 104 on which three longitudinal screws 105 are mounted arranged at 120° with respect to each other (only two of such screws being visible in FIG. 1).

Apparatus 100 comprises a device 110 slidable along a direction x parallel to the axis of rotation X-X of the forming support 50, and thus in the two opposite ways of the direction indicated in FIGS. 1 and 2 by arrow F, between a distal position with respect to the forming support 50 and a position close to the forming support 50, so as to approach, or move away from, the forming support 50.

Device 110 is intended for supporting the annular anchoring structure 10 and bringing it in contact with the end edge 2a of the carcass ply 2. In particular, device 110 acts on the substantially circumferential annular insert 11 of the annular anchoring structure 10 by supporting and pushing it against shoulder 51 of the forming support 50. The annular anchoring structure 10 is thus positioned at the desired position on the end edge 2a of the carcass ply 2. Hereinafter in the present description, device 110 shall also be defined as "bead core positioning device".

Device 110 comprises an annular element 115 mounted, by respective runners 116, to the sliding tracks 103a.

In an alternative embodiment of apparatus 100 (not shown), instead of tracks 103a and of runners 116, longitudinal guides extending from the side upright 104 parallel to the longitudinal screws 105 may be provided for allowing the axial sliding of device 110. Preferably, three longitudinal guides are provided in this case, arranged at 120° with respect to each other, and thus one at each longitudinal screw 105. The annular element 115 in this case is slidingly coupled to the aforementioned longitudinal guides by respective sliding bushes.

A plurality of bead core positioning members 118 are mounted on the annular element 115 (one of these is shown in detail in FIG. 2), the positioning members 118 being arranged adjacent to each other in a circumferential direction and coaxially to axis X-X of the forming support 50. Each bead core positioning member 118 comprises a support portion 111 of the annular anchoring structure 10, a portion 112 for pushing the annular anchoring structure 10, arranged in a radially outer position to the support portion 111 and an arm 112a integral with respect to the thrust portion 112 and intended for allowing the coupling of the positioning member 118 to the annular element 115.

Preferably, the bead core positioning members are at least eight. More preferably, such members are sixteen or twenty-four.

Arms 112a are radially and synchronously movable with respect to axis X-X of the forming support 50, and thus in the two opposite ways of the direction indicated in FIGS. 1 and 2 by arrow R.

The radial synchronous movement of arms 112a allows the radial synchronous movement of the positioning members 118 and thus the radial expansion/contraction of the bead core positioning device 110 between a maximum contraction position and a maximum expansion position. Device 110 can thus take on a plurality of different operating setup configurations according to the radial dimension of the tyre to be manufactured, each of such configurations being defined by a corresponding radial operating position of the positioning members 118.

Details on the way the radial movement of arms 112a, and thus the radial expansion/contraction of the bead core positioning device 110 is obtained, shall be given hereinafter in the present description.

Apparatus 100 further comprises a device 120 for pulling down the end edge 2a of the carcass ply 2 towards the axis X-X of the forming support 50. Such pulling down is required, in the embodiment shown in the annexed drawings, for allowing the bead core positioning device 110 to approach the forming support 50 for positioning the annular anchoring structure 10 at the desired position on the end edge 2a of the carcass ply 2. Hereinafter in the present description, device 120 shall also be defined as "ply pulling down device".

As shown in FIGS. 1 and 2, device 120 is slidable parallel to axis X-X with respect to the bead core positioning device 110 in the two opposite ways of the direction indicated by arrow G.

Device 120 comprises an annular element 125 slidingly mounted, by respective runners 126 (FIG. 1), to the sliding tracks 103b mounted on the base 101. If longitudinal guides parallel to longitudinal screws 105 are provided for the axial sliding of the bead core positioning device 110, also tracks 103b and runners 126 (as well as tracks 103a and runners 116) may be omitted and the annular element 125 may be slidingly coupled to the above longitudinal guides by respective sliding bushes.

The annular element 125 is further coupled, by respective lead nuts 127, to the longitudinal screws 105. Lead nuts 127, once actuated in rotation, allow the sliding of the annular element 125 along a direction x parallel to the axis X-X of the forming support 50.

The annular element 125 is arranged in an axially external position to the annular element 115 of the bead core positioning device 110 with respect to the forming support 50. Between the annular element 125 and the annular element 115 a pair of pneumatic cylinders 117a, 117b intended for controlling the relative axial sliding of the annular element 115 with respect to the annular element 125 are provided.

A plurality of ply pulling down members 128 are mounted on the annular element 125 (one of these is shown in detail in FIG. 2), the pulling down members 128 being arranged adjacent to each other in a circumferential direction and coaxially to the axis X-X of the forming support 50. Such ply pulling down members 128 comprise respective arms 128a radially and synchronously movable with respect to the axis X-X of the forming support 50, and thus in the two opposite ways of the direction indicated in FIGS. 1 and 2 by arrow R'.

The radial synchronous movement of arms 128a allows the radial synchronous movement of the ply pulling down members 128 and thus the radial expansion/contraction of the ply pulling down device 120 between a maximum contraction position and a maximum expansion position. Device 120 can thus take on a plurality of different operating setup configurations according to the radial dimension of the tyre to be manufactured, each of such configurations being defined by a corresponding radial operating position of the ply pulling down members 128.

Figure 3:
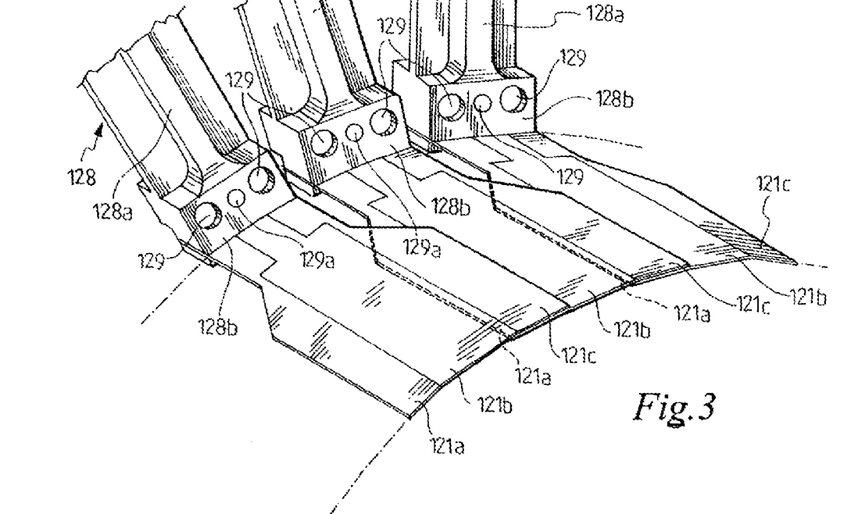
FIG. 3 is a schematic perspective view of a portion of the ply pulling down device of the apparatus of FIG. 1.
Figure 4:
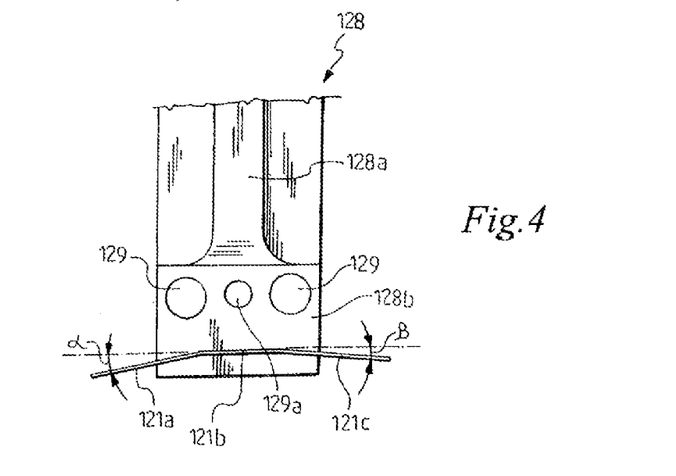
FIG. 4 is a schematic front view of an element of the portion of FIG. 3.

As illustrated in FIGS. 2-4, each ply pulling down member 128 comprises, at a radially inner portion 128b of arms 128a, a pair of holes 129. Holes 129 house respective sliding guides 119 extending parallel to the axis X-X of the forming support 50 and integral to the thrust member 112 of a respective bead core positioning member 118 (FIG. 2).

Each ply pulling down member 128 therefore is slidable on the sliding guides 119 with respect to the bead core positioning member 118 and is radially supported by the respective bead core positioning member 118 to which it is associated, so that the radial movement of arm 128a of each ply pulling down member 128 is actuated by the radial movement of arm 112a of the respective bead core positioning member 118.

A central hole 129a is provided between holes 129, the central hole 129a being suitable for housing a sliding guide (not visible in FIG. 2) extending parallel to axis X-X of the forming support 50 between the sliding guides 119 and integral to the support member 111 of a respective bead core positioning member 118, so as to allow, if desired, the relative axial sliding of the support portion 111 with respect to the thrust portion 112. Preferably, a compression spring (not shown in FIG. 2) is active between the head 119a of the sliding guide 119 and the radially inner portion 128b of arm 128a which in rest configuration, keeps the support portion 111 in the position shown in FIG. 2.

As illustrated in FIGS. 3 and 4, each ply pulling down member 128 comprises a plurality of finger plates 121 (three in the annexed figures, respectively indicated with 121a, 121b and 121c), extending longitudinally at a radially inner surface of the radially inner portion 128b of arms 128a and partially overlapped in a circumferential direction. In particular, finger plate 121c of a ply pulling down member 128 is partially overlapped to finger plate 121a of the same member, whereas the central finger plate 121b of such member is partially overlapped to the aforementioned finger plates 121a and 121c. In order to do so, finger plate 121a has an inclination angle α greater than the inclination angle β of finger plate 121c, so as to facilitate the overlapping of finger plate 121c on finger plate 121a (FIG. 4).

FIG. 3 also shows how the circumferentially outer finger plates 121 of two circumferentially consecutive ply pulling down members 128 are arranged in such a way as to also be partially overlapped in the circumferential direction. In particular, finger plate 121c of a ply pulling down member 128 is partially overlapped to finger plate 121a of the circumferentially consecutive ply pulling down member 128.

Finger plates 121 are preferably made of elastically bending material and are shaped so that, at rest, as a whole they take on an open corolla-like configuration, that is, a configuration expanded in a radial direction. When stressed in the radial direction, finger plates 121 on the other hand may take on, as a whole, a closed or radially contracted configuration.

During the relative sliding of the ply pulling down device 120 with respect to the bead core positioning device 110, finger plates 121 axially slide in the direction x in a position radially internal with respect to the bead core positioning members 118 (FIG. 2).

In the embodiment shown in the annexed figures, finger plates 121 are kept in the radially contracted configuration thereof by the bead core positioning members 118 of the bead core positioning device 110 when such device is radially overlapped to finger plates 121 (FIG. 2). Finger plates 121 on the other hand, take on the radially expanded configuration when the finger plate pulling down device 120 is axially moved with respect to the bead core positioning device 110 in the direction x and so that the latter is not radially overlapped to finger plates 121.

The shape and the position of finger plates 121 is such that they remain partially overlapped in the circumferential direction when they are in the radially expanded configuration thereof.

Apparatus 100 further comprises a device 130 for pulling down the filling insert 12, mounted on the bead core positioning device 110 (FIG. 2).

In the specific embodiment illustrated in FIG. 2, device 130 comprises a plurality of filling insert pulling down members 138 each provided with a respective roller 131 (only one whereof is illustrated). Roller 131 is mounted on the top surface of the thrust member 112 of each bead core positioning member 118.

In this way, the radial movement of the bead core positioning members 118 causes a corresponding radial movement of rollers 131, and thus the radial expansion/contraction of device 130. The aforementioned device 130 can thus be used for pulling down the filling insert 12 of the annular anchoring structure 10 for different radial dimensions of the tyre to be manufactured.

Rollers 131 are arranged one next to the other in a circumferential direction coaxially with respect to axis X-X of the forming support 50.

Each roller is elastically associated to the respective bead core positioning member 118, as described in patent application PCT/IB2007/003500 to the same Applicant. In particular, each roller 131 is kept pressed, by a special compression spring 132, against the radially outer surface of the thrust member 112 of the respective bead core positioning member 118.

The pulling down of the filling insert 12 on the end edge 2a of the carcass ply 2 takes place as a consequence of the rolling of rollers 131 on the radially outer surface of the radially outer annular portion of the respective bead core positioning member 118 and on the side surface 12a of the filling insert 12 of the annular anchoring structure 10, starting from a radially inner annular portion of such side surface 12a to continue on a portion of the side surface 12a radially outermost with respect to the aforementioned radially inner annular portion.

Apparatus 100 further comprises a device 140 suitable for turning up the end edge 2a of the carcass ply about the annular anchoring structure 10 in order to form a turned up end portion of the carcass ply 2 comprising the annular anchoring structure 10 therein. Hereinafter in the present description, device 140 shall also be defined as "turning up device".

Figure 5:
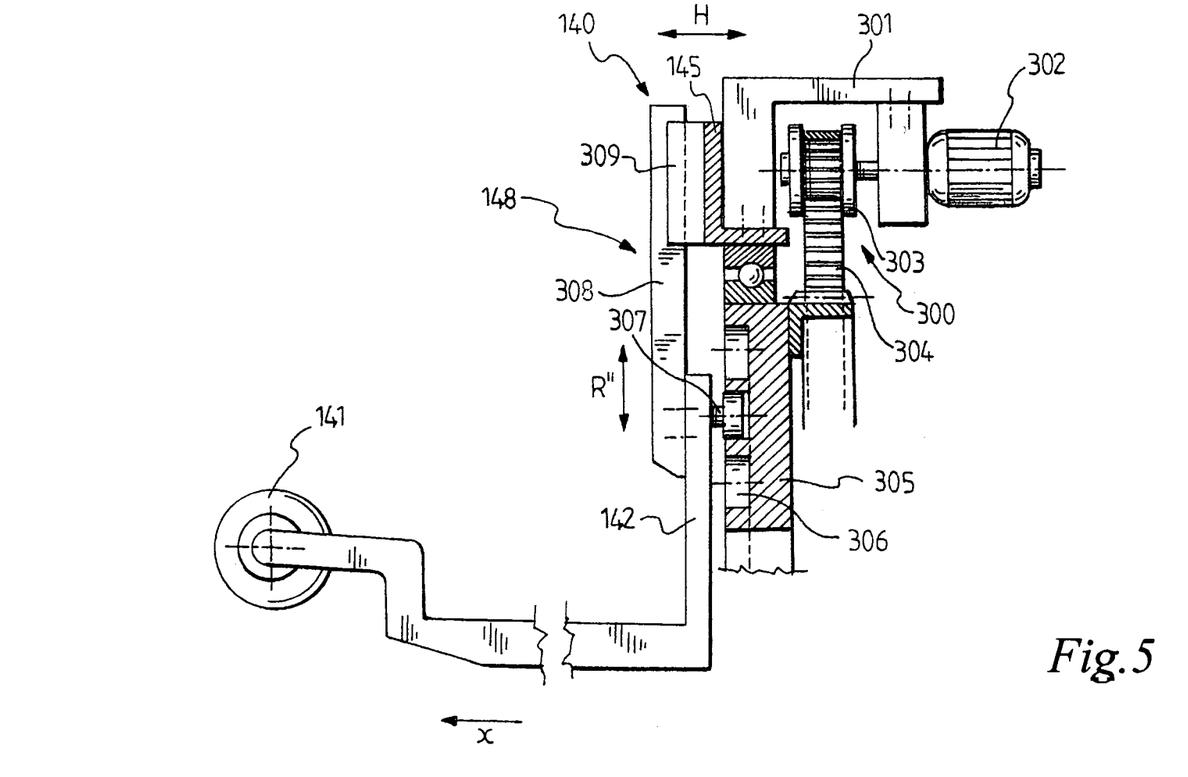
FIG. 5 is an enlarged schematic side view of a portion of a turning up device of the apparatus of FIG. 1.

Device 140 is slidable parallel to axis X-X with respect to the bead core positioning device 110 and to the ply pulling down device 120 in the two opposite ways of the direction indicated by arrow H in FIGS. 1 and 5.

As shown in FIG. 1, device 140 comprises an annular element 145 mounted, by respective runners 146, to the sliding tracks 103a and by respective lead nuts 147 to the longitudinal screws 105. Lead nuts 147, once actuated in rotation, allow the sliding of the annular element 145 along direction x parallel to the axis X-X of the forming support 50.

If longitudinal guides parallel to longitudinal screws 105 are provided in place of tracks 103a, 103b and of runners 116, 126 for the axial sliding of the bead core positioning device 110 and of the device 120 for pulling down the end edge 2a of the carcass ply 2, the annular element 145 is slidingly coupled to the above longitudinal guides by respective sliding bushes.

The annular element 145 is arranged in an axially external position to the annular element 125 of device 120 for pulling down the end edge of the carcass ply with respect to the forming support 50.

A plurality of turning up members 148 are mounted on the annular element 145 (one of these is shown in detail in FIG. 5), the turning up members 148 being arranged adjacent to each other in a circumferential direction and coaxially to axis X-X of the forming support 50.

The number of turning up members 148 is equal to that of the positioning members 118.

Each turning up member 148 comprises a respective roller 141 supported by a respective arm 142. The rollers are arranged adjacent to one another along a circumferential direction and coaxially to axis X-X of the forming support 50.

Figure 6:
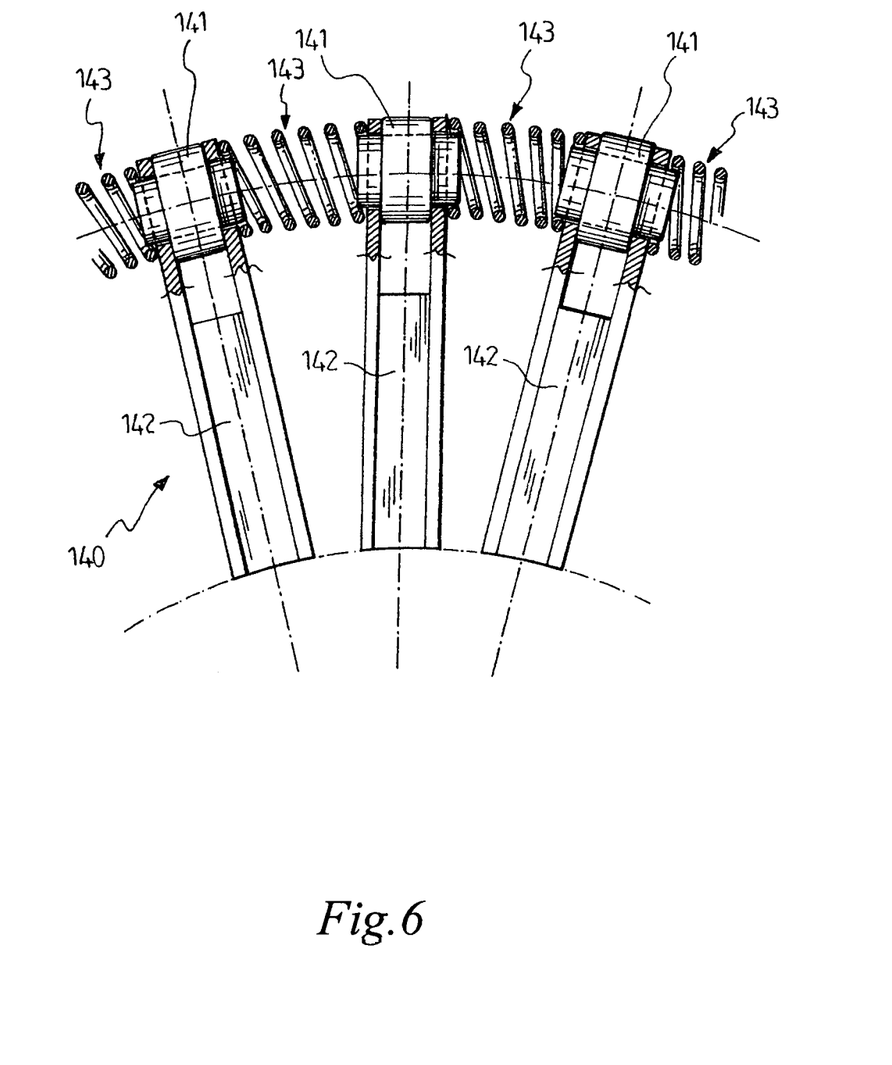
FIG. 6 is a schematic front view of a portion of the device of FIG. 5.

As shown in FIG. 6, each roller 141 is associated to the circumferentially consecutive roller 141 by the interposition of a respective compression spring 143.

Arms 142 are axially and radially movable in a synchronous manner with respect to the forming support 50 along a path that reproduces the profile of the annular anchoring structure 10 when the filling insert 12 is pull down on the carcass ply 2. The synchronised radial movement of arms 142 causes the synchronised radial movement of the turning up members 148 and thus, the radial expansion/contraction of the turning up device 140.

The radial expansion of device 140, along with the axial movement of the aforementioned device along the direction x, allows turning up the end edge 2a of the carcass ply 2 about the annular anchoring structure 10, as is described for example in patent application WO2008/001154 to the same Applicant.

The synchronous radial movement of the arms 142 of the turning up device 140 with respect to the axis X-X of the forming support 50, and thus in the two opposite ways of the direction indicated in FIGS. 1 and 2 by arrow "R", further allows setting up the turning up device 140 to a plurality of different operating configurations according to the radial dimension of the tyre to be manufactured, each of such configurations being defined by a corresponding operating radial position of the arms 142 of the turning up members 148.

The radial movement of arms 112a of the bead core positioning members 118 takes place synchronously to that of arms 142 of the turning up members 148. Such movement is obtained by respective control devices 200, 300 totally similar.

Figure 7:
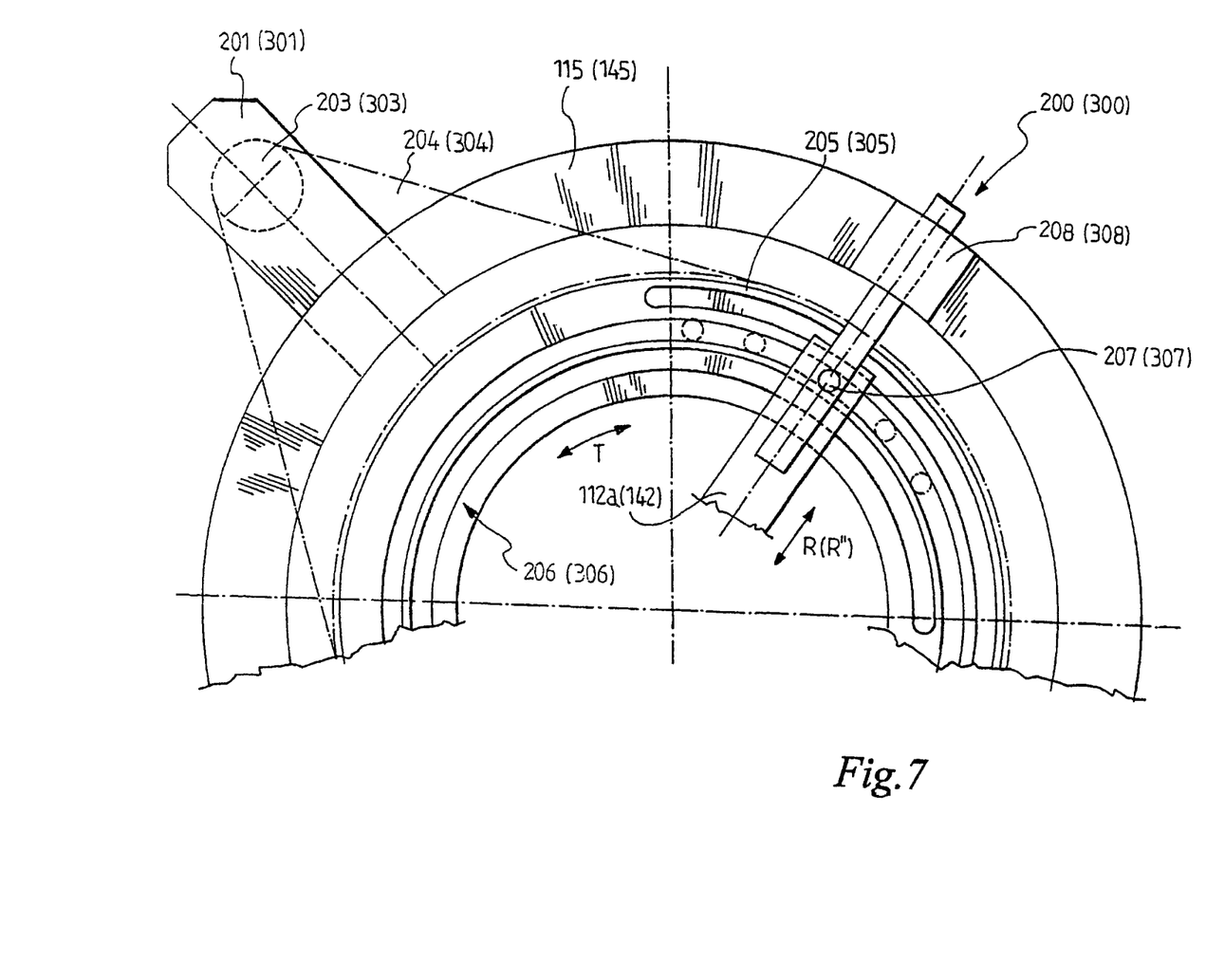
FIG. 7 is a schematic front view of a portion of the bead core positioning device of FIG. 2 and of the turning up device of FIG. 5.

Below is a detailed description of the control device 200 of the radial movement of arms 112a of the bead core positioning members 118, referring to FIGS. 2 and 7. The control device 300 of the radial movement of arms 142 of the turning up members 148 is totally similar to device 200 and its components are identified in FIGS. 3 and 7 with reference numbers corresponding to those related to device 200 and increased by 100. The reference numbers of the components of device 300 are shown hereinafter, and in FIG. 7, in brackets next to the reference numbers of the components of device 200.

Device 200 (300) comprises a bracket 201 (301) attached to the axially outer face of the annular element 115 (145) and intended for supporting a motor reduction unit 202 (302).

A pulley 203 (303) is further mounted on bracket 201 (301), in axis with the motor reduction unit 202 (302). Motor reduction unit 202 (302) controls the rotation of pulley 203 (303) which, through belt 204 (304), imparts a rotation to an annular member 205 (305) mounted on the axially outer face of the annular element 115 (145). A spiral guide 206 (306) shaped according to an Archimedes spiral is formed on the axially inner face of the annular member 205 (305) (FIG. 7).

Arm 112a (142) of each member 118 (148) is slidingly associated to guide 206 (306) by a respective pin 207 (307). It should be noted that for clarity reasons, only one arm 112a (142) is shown in FIG. 7. Arm 112a (142) of each member 118 (148) is further rigidly connected to a guide 208 (308) which is slidingly associated to a respective runner 209 (309) mounted on the annular element 115 (145) and arranged according to a radial direction. The rotation of the annular member 205 (305) by a predetermined angle along the circumferential direction indicated with T in FIG. 7 therefore causes a corresponding shifting of each arm 112a (142) along the radial direction indicated with R (R") in FIG. 7. The synchronous and centred movement of the bead core positioning members 118 and of the turning up members 148, and thus the radial expansion/contraction of the bead core positioning device 110 and of the turning up device 140, are thus obtained.

In the light of the fact that, as said above, each ply pulling down member 128 and each member 138 for pulling down the filling insert 12 is constrained, in the radial direction, to a respective bead core positioning member 118, the radial movement of the ply pulling down members 128 and of the members 138 for pulling down the filling insert 12 takes place integrally to the radial movement of the bead core positioning member 118.

From the above description it is clear that the possibility of the bead core positioning device 110, of the ply pulling down device 120, of the filling insert pulling down device 130 and of the turning up device 140, of radially expanding/contracting with respect to the forming support 50 allows the use of apparatus 100 of the present invention for manufacturing a plurality of tyres having different radial dimension, in particular tyres with at least four different and adjacent fittings.

The invention claimed is:

1. An apparatus for manufacturing a tyre for a vehicle wheel, the tyre comprising a carcass structure formed starting from a carcass ply laid on a forming support extended along a longitudinal axis, comprising:
    a device for positioning an annular anchoring structure on an edge at an axial end of said carcass ply, the positioning device being circumferentially extended around the longitudinal axis of the forming support and axially movable with respect to the forming support between an operating position distal from the forming support and an operating position close to the forming support;
    a turning up device for turning up the edge of the carcass ply around the annular anchoring structure, the turning up device being circumferentially extended around the longitudinal axis of the forming support and axially movable for approaching/moving away to/from the forming support,
        wherein the positioning device comprises a plurality of components mutually synchronized in radial motion and the turning up device comprises a plurality of components mutually synchronized in radial motion, the positioning device and turning up device being settable in a plurality of different operating radial positions, each operating radial position being selected based on a respective radial dimension of the tyre to be manufactured;
    a device for pulling down the edge of the carcass ply toward the longitudinal axis of the forming support, wherein said pulling down device is distinct from said turning up device, wherein a portion of the positioning device extends through an arm of the pulling down device, and wherein said pulling down device is positioned radially outward of said turning up device,
        wherein the pulling down device comprises a pulling down member slidably associated with a sliding guide extending parallel to the axis of the forming support, the pulling down member being slidable along the axis of the forming support with respect to the positioning device,
        wherein the pulling down member is mounted on an annular element and radially movable with respect to the axis of the forming support,
        wherein the turning up device is configured to move axially with respect to the positioning device during turning up of the edge of the carcass ply around the annular anchoring structure, and
        wherein the turning up device comprises a plurality of turning up members arranged adjacent to one another along a circumferential direction of the forming support and coaxially with the longitudinal axis of the forming support, said turning up members being radially movable in a synchronous manner with respect to the longitudinal axis of the forming support between a maximum contraction position and a maximum expansion position; and
    a device for controlling the radial movement of said turning up members, the control device comprising a sliding guide with a spiral shape and having a rotation around the longitudinal axis of the forming support which can be controlled, and a plurality of sliding runners extending radially with respect to said longitudinal axis, each of said turning up members being slidingly coupled to a respective one of the sliding runners and to said sliding guide with a spiral shape so that a predetermined angular movement of the sliding guide causes a predetermined radial movement of each turning up member,
        wherein each turning up member comprises a roller associated with a free end of a respective arm, each roller being coupled to a circumferentially consecutive roller by a compression spring.

2. The apparatus according to claim 1, wherein the positioning device comprises a plurality of positioning members arranged adjacent to one another along the circumferential direction and coaxially to the longitudinal axis of the forming support, said positioning members being radially movable in a synchronous manner with respect to the longitudinal axis of the forming support between a maximum contraction position and a maximum expansion position.

3. The apparatus according to claim 2, comprising a device for controlling the radial movement of said positioning members, the control device for controlling the radial movement of said positioning members comprising a sliding guide with a spiral shape and having a rotation which can be controlled, about the longitudinal axis of the forming support, and a plurality of sliding runners extending radially with respect to said longitudinal axis, each of said positioning members being slidingly coupled to a respective one of the sliding runners of the device for controlling the radial movement of said positioning members and to said sliding guide with a spiral shape of the device for controlling the radial movement of said positioning members so that a predetermined angular movement of the sliding guide of the device for controlling the radial movement of said positioning members causes a predetermined radial movement of each positioning member.

4. The apparatus according to claim 1, wherein the positioning device comprises a plurality of positioning members arranged adjacent to one another along the circumferential direction and coaxially to the longitudinal axis of the forming support, said positioning members being radially movable in a synchronous manner with respect to the longitudinal axis of the forming support between a maximum contraction position and a maximum expansion position, wherein the positioning device and the turning up device are slidingly mounted on a sliding track extended along a direction parallel to the longitudinal axis of the forming support, the turning up device being associated with said sliding track in an axially outer position to the positioning device with respect to the forming support and wherein the arms of the turning up members are arranged in a radially inner position with respect to the positioning members and configured to axially slide along the sliding track with respect to the positioning members.

5. The apparatus according to claim 1, wherein said pulling down device is circumferentially extended around the longitudinal axis of the forming support and axially movable separately from the positioning device and the turning up device between an operating position distal from the forming support and an operating position close to the forming support, and wherein said pulling down device is radially expandable/contractible with respect to the longitudinal axis of the forming support synchronously to the positioning device, and is settable in a plurality of different operating radial positions, each operating radial position being selected based on a respective radial dimension of the tyre to be manufactured.

6. The apparatus according to claim 5, wherein said pulling down device comprises a plurality of ply pulling down members arranged adjacent to one another along the circumferential direction and coaxially to the longitudinal axis of the forming support, said ply pulling down members being radially movable with respect to the longitudinal axis of the forming support between a maximum contraction position and a maximum expansion position.

7. The apparatus according to claim 6, wherein each of said ply pulling down members comprises at least two longitudinal finger plates side-by-side in the circumferential direction.

8. The apparatus according to claim 7, wherein the circumferentially adjacent finger plates of two circumferentially consecutive ply pulling down members are partially overlapped in the circumferential direction.

9. The apparatus according to claim 7, wherein the positioning device is axially slidable in a radially outer position with respect to said finger plates and wherein for a predetermined radial position of the positioning device and of the pulling down device, the finger plates are configured to be cylindrically-aligned when overlapped with the positioning device and flared radially outwardly when not overlapped with the positioning device.

10. The apparatus according to claim 1, wherein said annular anchoring structure comprises a substantially circumferential annular insert and a filling insert associated in a radially outer position with respect to the substantially circumferential annular insert, the apparatus comprising a device for pushing down the filling insert on the edge of the carcass ply.

11. The apparatus according to claim 10, wherein the positioning device comprises a plurality of positioning members arranged adjacent to one another along the circumferential direction and coaxially to the longitudinal axis of the forming support, said positioning members being radially movable in a synchronous manner with respect to the longitudinal axis of the forming support between a maximum contraction position and a maximum expansion position, and wherein the device for pushing down the filling insert comprises a plurality of filling insert pushing down members, each of the filling insert pushing down members being supported by a respective one of the positioning members and being axially slidable with respect to the positioning member by which it is supported.

12. A process for manufacturing a tyre for a vehicle wheel, the tyre comprising a carcass structure formed starting from a carcass ply laid on a forming support extended along a longitudinal axis, the process including:
  providing an apparatus comprising:
    a device for positioning an annular anchoring structure on an edge at an axial end of said carcass ply, the positioning device being circumferentially extended around the longitudinal axis of the forming support and axially movable with respect to the forming support between an operating position distal from the forming support and an operating position close to the forming support;
    a turning up device for turning up the edge of the carcass ply around the annular anchoring structure, the turning up device being circumferentially extended around the longitudinal axis of the forming support and axially movable for approaching/moving away to/from the forming support,
    wherein the positioning device comprises a plurality of components mutually synchronized in radial motion and the turning up device comprises a plurality of components mutually synchronized in radial motion, the positioning device and turning up device being settable in a plurality of different operating radial positions, each operating radial position being selected based on a respective radial dimension of the tyre to be manufactured;
    a device for pulling down the edge of the carcass ply toward the longitudinal axis of the forming support, wherein said pulling down device is distinct from said turning up device, wherein a portion of the positioning device extends through an arm of the pulling down device, and wherein said pulling down device is positioned radially outward of said turning up device,
    wherein the pulling down device comprises a pulling down member slidably associated with a sliding guide extending parallel to the axis of the forming support, the pulling down member being slidable along the axis of the forming support with respect to the positioning device,
    wherein the pulling down member is mounted on an annular element and radially movable with respect to the axis of the forming support,
    wherein the turning up device is configured to move axially with respect to the positioning device during turning up of the edge of the carcass ply around the annular anchoring structure, and
    wherein the turning up device comprises a plurality of turning up members arranged adjacent to one another along a circumferential direction of the forming support and coaxially with the longitudinal axis of the forming support, said turning up members being radially movable in a synchronous manner with respect to the longitudinal axis of the forming support between a maximum contraction position and a maximum expansion position; and a device for controlling the radial movement of said turning up members, the control device comprising a sliding guide with a spiral shape and having a rotation around the longitudinal axis of the forming support which can be controlled, and a plurality of sliding runners extending radially with respect to said longitudinal axis, each of said turning up members being slidingly coupled to a respective one of the sliding runners and to said sliding guide with a spiral shape so that a predetermined angular movement of the sliding guide causes a predetermined radial movement of each turning up member, wherein each turning up member comprises a roller associated with a free end of a respective arm, each roller being coupled to a circumferentially consecutive roller by a compression spring;

arranging the carcass ply on the forming support; and positioning the annular anchoring structure at the edge of the axial end of the carcass ply.

* * * * *

UNITED STATES PATENT AND TRADEMARK OFFICE
CERTIFICATE OF CORRECTION

PATENT NO. : 9,616,628 B2  
APPLICATION NO. : 13/055114  
DATED : April 11, 2017  
INVENTOR(S) : Gianni Mancini et al.

Page 1 of 1

It is certified that error appears in the above-identified patent and that said Letters Patent is hereby corrected as shown below:

In the Claims

Claim 3, Column 14, Line 56, "the control device for controlling" should read --the device for controlling--.

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*